United States Patent
Inui et al.

(10) Patent No.: US 10,198,826 B2
(45) Date of Patent: Feb. 5, 2019

(54) METHOD FOR MEASURING BLADE WIDTH OF GROOVING TOOL

(71) Applicant: O-M LTD., Osaka-shi, Osaka (JP)

(72) Inventors: Hiroki Inui, Nagaoka (JP); Dai Ito, Shinagawa-ku (JP); Hirofumi Nakakubo, Nagaoka (JP); Katsunori Kabasawa, Nagaoka (JP); Yuta Yoshida, Nagaoka (JP)

(73) Assignee: O-M LTD., Osaka-shi, Osaka (JP)

( * ) Notice: Subject to any disclaimer, the term of this patent is extended or adjusted under 35 U.S.C. 154(b) by 9 days.

(21) Appl. No.: 15/663,928

(22) Filed: Jul. 31, 2017

(65) Prior Publication Data
US 2018/0053317 A1 Feb. 22, 2018

(30) Foreign Application Priority Data
Aug. 18, 2016 (JP) .................. 2016-160358

(51) Int. Cl.
*H04N 7/18* (2006.01)
*G06T 7/60* (2017.01)
(Continued)

(52) U.S. Cl.
CPC ............. *G06T 7/60* (2013.01); *G01B 11/022* (2013.01); *G06T 7/0004* (2013.01); *G06T 2207/30164* (2013.01)

(58) Field of Classification Search
CPC ...................................................... G06T 7/60
(Continued)

(56) References Cited

U.S. PATENT DOCUMENTS

| | | | | | |
|---|---|---|---|---|---|
| 3,824,695 | A | * | 7/1974 | McClay, Jr. | ............. B25H 7/02 33/759 |
| 4,007,543 | A | * | 2/1977 | McClay, Jr. | ......... G01B 3/1071 33/759 |

(Continued)

FOREIGN PATENT DOCUMENTS

| JP | 02168105 A | 6/1990 |
|---|---|---|
| JP | 02218536 A | 8/1990 |

(Continued)

OTHER PUBLICATIONS

Communication dated Mar. 12, 2018 from the Japanese Patent Office in counterpart Japanese application No. 2016-160358.

*Primary Examiner* — Leron Beck
(74) *Attorney, Agent, or Firm* — Sughrue Mion, PLLC

(57) ABSTRACT

The present invention provides a method for accurately and simply measuring a blade width (W) of a blade tip section (1) of a grooving tool mounted on a machine tool. The blade tip section (1) is divided vertically or laterally and imaged so as to capture, one side at a time, a first-side corner section (2) formed on a first blade-width-direction side and a second-side corner section (4) formed on a second blade-width-direction side, of the corner sections formed at both ends of the blade tip section (1), the terminal end of each corner section of an imaged picture (3) of the first side of the blade tip section in which the first side of the blade tip section (1) is imaged and an imaged picture (5) of the second side of the blade tip section in which the second side is imaged is acquired, and, on the basis thereof, a blade width (W1) of the imaged picture of the first side of the blade tip section is measured from the imaged picture (3) of the first side of the blade tip section and a blade width (W2) of the imaged picture of the second side of the blade tip section is measured from the imaged picture (5) of the second side of (Continued)

the blade tip section to carry out computational processing on the basis of these values and determine the blade width (W).

4 Claims, 3 Drawing Sheets

(51) Int. Cl.
*G01B 11/02* (2006.01)
*G06T 7/00* (2017.01)

(58) Field of Classification Search
USPC .......................................................... 348/92
See application file for complete search history.

(56) References Cited

U.S. PATENT DOCUMENTS

| | | | | |
|---|---|---|---|---|
| 4,965,935 A | * | 10/1990 | Bourque | B25H 7/02 |
| | | | | 33/26 |
| 5,016,509 A | * | 5/1991 | Stottman | B27B 25/10 |
| | | | | 294/15 |
| 5,573,442 A | * | 11/1996 | Morita | B24B 3/361 |
| | | | | 451/5 |
| 2002/0104411 A1 | * | 8/2002 | Alvarez-Mendez | B23D 1/28 |
| | | | | 82/1.11 |
| 2010/0269650 A1 | * | 10/2010 | Hojo | B24B 49/12 |
| | | | | 83/13 |

FOREIGN PATENT DOCUMENTS

| | | | |
|---|---|---|---|
| JP | 06114694 | A | 4/1994 |
| JP | 9-085583 | A | 3/1997 |
| JP | 2012091290 | A | 5/2012 |

* cited by examiner

METHOD FOR MEASURING BLADE WIDTH OF GROOVING TOOL

BACKGROUND OF THE INVENTION

1. Field of the Invention

The present invention relates to a method for measuring the blade width of a blade tip section of a grooving tool mounted on a machine tool.

2. Description of the Related Art

Throwaway bits are configured so that a tip (blade tip section) and a shank (holder) are separately formed, and the tip is mechanically joined to, and thereby interchangeably mounted on, the shank. Throwaway bits are currently the most common cutting tool because abraded tips can be interchanged and there are other features that provide excellent convenience.

When a throwaway bit is to be used, a worker mounts and uses a tip suitable to the tool information set in the machining conditions. However, important locations for machining the nose radius, tip width, and the like differ slightly in the mounted tip, and there are many tips that appear to be the same at first glance but are difficult to assess whether the tool meets the machining conditions. Consequently, a tip with different tool information erroneously set when the tip is mounted can end up being mounted, and machining defects occur.

In view of the above, a tool assessment device as disclosed in, e.g., JP-A 9-85583 has been proposed for preventing the occurrence of machining defects due to such tip-mounting errors.

The tool assessment device of JP-A 9-85583 images the next tool to be used via imaging means, identifies the tool by shape recognition means from tool image data obtained from the imaging, and uses assessment means to assess whether the tool identified by the shape recognition means matches the tool specified by the tool information set in the machining conditions of a NC program, etc.

In the case of a grooving tool in which a tool to be assessed is to be used in groove machining in a tool assessment device such as described above, a method may be used in which the blade width of the tip distal end section (hereinafter referred to as blade tip section) of the grooving tool is measured, and the measured blade width and the blade width in the tool information are compared to perform assessment.

In such a case of measuring the blade width, the blade tip section of the grooving tool is imaged by imaging means, and the blade width is measured from the image data. However, the blade tip section of the grooving tool has a greater blade width than a blade tip section for outside diameter cutting and inside diameter cutting, and may therefore not come within the imaging range of the camera. In such a case, the size of the camera elements must be increased or the lens magnification must be reduced to increase the imaging range.

PRIOR ART DOCUMENTS

[Patent Documents]
[Patent Document 1] JP-A 9-85583

SUMMARY OF THE INVENTION

However, increasing the element size makes the camera more expensive, and there is therefore a limit to increasing the element size. Also, when the magnification is reduced, the resolution of the image data is reduced and measurement precision declines. Therefore, there is a need to set a novel measurement method in which the above-described problem does not occur in relation to a method for measuring the blade width of the blade tip section of a grooving tool.

With the foregoing problems of the prior art in view, it is an object of the present invention to provide a method capable of measuring the blade width of the blade tip section of the grooving tool at high precision without increasing the imaging range by reducing magnification or using an expensive camera having a large elements, and regardless of the width of the blade of the blade tip section of the grooving tool.

The main points of the present invention will be described with reference to the attached drawings.

A first aspect of the present invention relates to a method for measuring a blade width W of a blade tip section 1 of a grooving tool mounted on a machine tool, wherein a determination is made of a blade width W1 of an imaged picture of a first side of the blade tip section, which is based on an imaged picture 3 of the first side of the blade tip section from a terminal end 2A of a first-side corner section 2 of the blade tip section 1 in the imaged picture 3 of the first side of the blade tip section to an intermediate point along the blade width W of the blade tip section 1, the imaged picture 3 of the first side of the blade tip section being obtained by imaging, using imaging means provided to the machine tool, the first blade-width-direction side of the blade tip section 1 including the first-side corner section 2 formed on the first blade-width-direction side of a corner section; a determination is made of a blade width W2 of an imaged picture of the second side of the blade tip section, which is based on an imaged picture 5 of a second side of the blade tip section from a terminal end 4A of a second-side corner section 4 of the blade tip section 1 in the imaged picture 5 of the second side of the blade tip section to an intermediate point along the blade width W of the blade tip section 1, the imaged picture 5 of the second side of the blade tip section being obtained by imaging, using the imaging means, the second blade-width-direction side of the blade tip section 1 including the second-side corner section 4 formed on the second blade-width-direction side of the corner section; the corner sections are formed at each of the two blade-width-direction ends of the blade tip section 1 of the grooving tool; and computational processing is performed on the basis of the blade width W1 in the imaged picture of the first side of the blade tip section and the blade width W2 in the imaged picture of the second side of the blade tip section to determine the blade width W of the blade tip section 1 of the grooving tool.

A second aspect of the present invention is the method for measuring a blade width of a grooving tool according to the first aspect, wherein the blade width W1 in the imaged picture of the first side of the blade tip section, the blade width W2 in the imaged picture of the second side of the blade tip section, a width-direction length L1 of the imaging range, which is the direction of movement of the grooving tool in the imaging range of the imaging means, and the movement distance L2 of the grooving tool or the imaging means from a first imaging position where the imaged picture 3 of the first side of the blade tip section has been imaged to a second imaging position where the imaged picture 5 of the second side of the blade tip section has been imaged, are each determined, and the computational processing is carried out using the formula W=W1+W2−(L1−L2) to determine the blade width W of the blade tip section 1 of the grooving tool.

A third aspect of the present invention is the method for measuring a blade width of a grooving tool according to the second aspect, wherein the blade width W1 in the imaged picture of the first side of the blade tip section is determined on the basis of a first-side blade-width-direction straight line A1 first-side blade-width-direction A1 that passes through the center point O1 of a first-side nose R of the first-side corner section 2 in the imaged picture 3 of the first side of the blade tip section, and on the basis of the terminal end 2A of the first-side corner section 2, which is an intersecting point of the first-side blade-width-direction straight line A1 with an outline of the blade tip section 1 of the grooving tool, and the blade width W2 in the imaged picture of the second side of the blade tip section is determined on the basis of a second-side blade-width-direction straight line A2 second-side blade-width-direction straight line A2 that passes through a center point O2 of a second-side nose R of the second-side corner section 4 in the imaged picture 5 of the second side of the blade tip section, and on the basis of the terminal end 4A of the second-side corner section 4, which is an intersecting point of the second-side blade-width-direction straight line A2 with the outline of the blade tip section 1 of the grooving tool.

A fourth aspect of the present invention is the method for measuring a blade width of a grooving tool according to the third aspect, wherein the blade width W1 in the imaged picture of the first side of the blade tip section is determined on the basis of the number of pixels between the terminal end 2A of the first-side corner section 2 and an imaged-picture end part X1 of the imaged picture 3 of the first side of the blade tip section on the first-side blade-width-direction straight line A1, and the blade width W2 in the imaged picture of the second side of the blade tip section is determined on the basis of the number of pixels between the terminal end 4A of the second-side corner section 4 and an imaged-picture end part X2 of the imaged picture 5 of the second side of the blade tip section on the second-side blade-width-direction straight line A2.

Effects of the Invention

The present invention measures the blade width of the blade tip section of a grooving tool mounted on a machine tool using the method as described above, and is therefore an innovative method of measuring the blade width of the grooving tool capable of measuring blade width with high precision similarly for wide and narrow blade widths without increasing the imaging range by reducing magnification or using an expensive camera having a large elements.

DESCRIPTION OF THE PREFERRED EMBODIMENTS

Figure 1A:
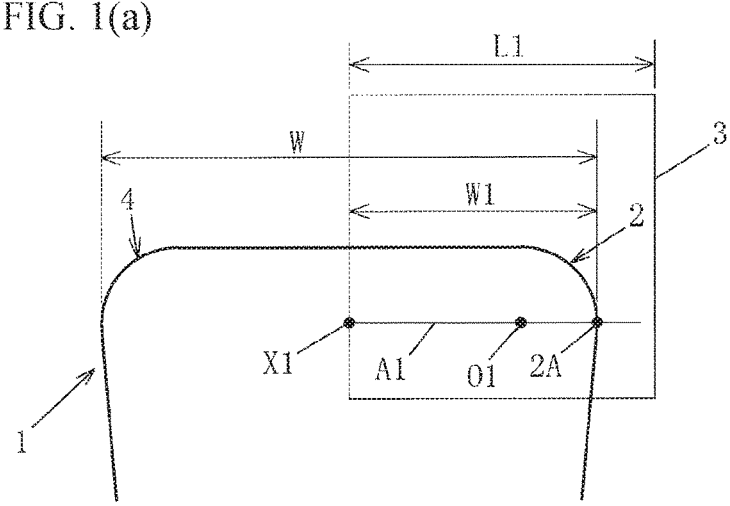
FIGS. 1(a) and 1(b) are schematic views (mainly an illustration of the imaging range) of measurement example 1 of the present example.

Preferred embodiments of the present invention will be briefly described illustrating the effects of the present invention with reference to the drawings.

When the blade width of the blade tip section 1 of a grooving tool is to be measured in the present invention, a blade tip section 1 of the grooving tool is imaged using imaging means (e.g., a camera) provided to a machine tool, and the blade width W is determined (measured) from a blade-tip-section-imaged picture of the blade tip section 1. However, imaging is not carried out so as to capture the entire blade tip section 1 in a single imaged picture, but rather to separately pick up two imaged pictures of the blade tip section 1: an imaged picture 3 of a first side of the blade tip section and an imaged picture 5 of a second side of the blade tip section.

The imaged picture 3 of the first side of the blade tip section is obtained by imaging a first blade-width-direction side of the blade tip section 1 so as to include a first-side corner section 2 formed on the first blade-width-direction side of the blade tip section 1. Also, the imaged picture 5 of the second side of the blade tip section is obtained by imaging a second blade-width-direction side of the blade tip section 1 so as to include a second-side corner section 4 formed on the second blade-width-direction side, which is the opposite side from the first side, of the blade tip section 1.

A blade width W1 in the imaged picture of the first side of the blade tip section, from a terminal end 2A of the first-side corner section 2 on a first width-direction side of the blade tip section 1 shown in the imaged picture 3 of the first side of the blade tip section to an intermediate point along the blade width W of the blade tip section 1, is determined from the imaged picture 3 of the first side of the blade tip section. A blade width W2 in the imaged picture of the second side of the blade tip section, from a terminal end 4A of the second-side corner section 4 on a second width-direction side of the blade tip section 1 shown in the imaged picture 5 of the second side of the blade tip section to an intermediate point along the blade width W of the blade tip section 1, is determined from the imaged picture 5 of the second side of the blade tip section. The blade width W of the blade tip section 1 of the grooving tool is obtained by computational processing based on the blade width W1 in the imaged picture of the first side of the blade tip section and the blade width W2 in the imaged picture of the second side of the blade tip section.

In the computational processing of the blade width W in the present example, the blade width W is computed by adding the blade width W1 in the imaged picture of the first side of the blade tip section and the blade width W2 in the imaged picture of the second side of the blade tip section when, e.g., there is no overlapping of imaging locations in the imaged picture 3 of the first side of the blade tip section and the imaged picture 5 of the second side of the blade tip section, and there are no locations on the blade tip section 1 that have not been imaged.

For example, when imaging has produced an overlap in imaging locations in the imaged picture 3 of the first side of the blade tip section and the imaged picture 5 of the second side of the blade tip section, the blade width W is computed by subtracting the overlapping area between the imaged picture 3 of the first side of the blade tip section and the imaged picture 5 of the second side of the blade tip section from the value obtained by adding the blade width W1 in the imaged picture of the first side of the blade tip section and the blade width W2 in the imaged picture of the second side of the blade tip section.

Also, for example, when imaging has been carried out without an overlap in imaging locations in the imaged picture 3 of the first side of the blade tip section and the imaged picture 5 of the second side of the blade tip section, but imaging has been carried out so as to produce an area of the blade tip section 1 that has not been imaged, i.e., when the blade width W of the blade tip section 1 is greater than the sum of the imaged areas (the length of the imaging range in the same direction as the blade width direction) of the imaged picture 3 of the first side of the blade tip section and the imaged picture 5 of the second side of the blade tip section, the blade width W is calculated by furthermore adding the non-imaged area part of the blade tip section 1 to the value obtained by adding the blade width W1 in the imaged picture of the first side of the blade tip section and the blade width W2 in the imaged picture of the second side of the blade tip section.

In the present invention, calculation of the area of overlap between the imaged picture 3 of the first side of the blade tip section and the imaged picture 5 of the second side of the blade tip section, and calculation of the non-imaged area, which is not imaged in either of the imaged pictures of the imaged picture 3 of the first side of the blade tip section and the imaged picture 5 of the second side of the blade tip section, can be carried out on the basis of, e.g., the width-direction length L1 of the imaging range, which is the grooving tool direction of movement (in other words, the blade width direction of the grooving tool) in the imaging range of the imaging means, and the movement distance L2 of the grooving tool or imaging means from a first imaging position where the imaged picture 3 of the first side of the blade tip section has been imaged to a second imaging position where the imaged picture 5 of the second side of the blade tip section has been imaged. Accordingly, the blade width W can be calculated using the following formula: $W = W1 + W2 - (L1 - L2)$.

The present invention is thusly capable of imaging the blade tip section 1 at twice the magnification of when the entire blade tip section 1 is imaged using at least one imaged picture because two imaged pictures of the blade tip section 1 are picked up separately: an imaged picture 3 of a first side of the blade tip section and an imaged picture 5 of a second side of the blade tip section, and measurements are made of the blade width W on the basis of the blade width W1 in the imaged picture of the first side of the blade tip section and the blade width W2 in the imaged picture of the second side of the blade tip section obtained from the imaged picture 3 of the first side of the blade tip section and the imaged picture 5 of the second side of the blade tip section, or additionally on the basis of the width-direction length L1 of the imaging range and the movement distance L2 between the imaging positions of the grooving tool or imaging means. The present invention is accordingly an innovative method of measuring the blade width of the grooving tool, with which it is possible to measure blade width with high precision similarly for wide and narrow blade widths W without using expensive imaging means (a camera) having a large element size or without reducing magnification to increase the imaging range.

EXAMPLE

A specific example of the present invention is described below with reference to the drawings.

The present example relates to a tool assessment device in which the method for measuring the blade width of a grooving tool of the present invention is used.

The tool assessment device of the present example assesses whether a tool mounted on a machine tool prior to the start of machining is the tool set in a machining program. The tool assessment device is more specifically configured so that: registered tool information of a tool to be used in machining (e.g., the length, width, diameter, nose R, and other tool dimension information; characteristic shapes, barcodes, marks, ID tags, or other tool identification information; etc.) is inputted to a tool assessment device using a method such as instructing, within a machining program, or instructing that the machining program refer to registered tool information stored in a control device; the inputted registered tool information and acquired tool information acquired from an imaged picture obtained by imaging the tool mounted on the machine tool are compared; when all values of the acquired tool information are values within a permissible range, assessment is made that the correct tool set in the machining program is mounted, and an instruction to proceed to the next work step is sent to the machine tool side (control device); and, when even one value among the plurality of acquired tool information falls outside the permissible range, assessment is performed that a tool (tip) that is different from the tool set in the machining program; i.e., an unsuitable tool (tip) that does not match the machining conditions, has been mounted, and an instruction (signal) for temporarily stopping work is sent to the machine tool side (control device), thereby preventing, in advance, a workpiece being machined with an unsuitable tool.

The tool assessment device of the present example is configured so that, when the tool to be assessed is a grooving tool, assessment is carried out on the basis of the blade width W (tip width) of the blade tip section 1 (grooving tip) of the grooving tool.

The tool assessment device of the present example is configured to image the blade tip section 1 using imaging means, specifically, a camera mounted on the machine tool in the same manner as other tools, and to measure the blade width W from an imaged picture of the blade tip section obtained by imaging the blade tip section 1.

Specifically, a determination is made of the blade width W1 in the imaged picture of the first side of the blade tip section based on the imaged picture 3 of the first side of the blade tip section from the terminal end 2A of the first-side corner section 2 of the blade tip section 1 in the imaged picture 3 of the first side of the blade tip section to an intermediate point along the blade width W of the blade tip section 1, the imaged picture 3 of the first side of the blade tip section being obtained by imaging, using a camera provided to the machine tool, the first blade-width-direction side of the blade tip section 1 including the first-side corner section 2 formed on the first blade-width-direction side of a corner section, and a determination is made of the blade width W2 in the imaged picture of the second side of the blade tip section based on the imaged picture 5 of the second side of the blade tip section from the terminal end 4A of the second-side corner section 4 of the blade tip section 1 in the imaged picture 5 of the second side of the blade tip section to an intermediate point along the blade width W of the blade tip section 1, the imaged picture 5 of the second side of the blade tip section being obtained by imaging using the camera, the second blade-width-direction side of the blade tip section 1 including the second-side corner section 4 formed on the second blade-width-direction side of a corner section, and the corner sections being formed at the two blade-width-direction ends of the blade tip section 1 of the grooving tool. Computational processing based on The blade width W of the blade tip section 1 of the grooving tool is determined by computational processing based on the blade width W1 in the imaged picture of the first side of the blade tip section and the blade width W2 in the imaged picture of the second side of the blade tip section.

The method for the measuring blade width of the grooving tool and the method for assessing a tool in the tool assessment device of the present example shall be described in detail below in accordance with the processing procedures thereof.

First, the blade width dimension information of the grooving tool set in the machining program is acquired.

Next, the blade tip section 1 of the grooving tool mounted on a machine tool (tool post) is imaged to acquire an imaged picture of the blade tip section.

An imaged picture of the blade tip section is acquired using a camera (CCD camera or digital camera) affixed to the machine tool at a predetermined position, and two imaged pictures of the blade tip section are acquired; i.e., the imaged picture 3 of the first side of the blade tip section in which a first side of the blade tip section 1 of the grooving tool in the blade width direction has been imaged and the imaged picture 5 of the second side of the blade tip section in which a second blade-width-direction side has been imaged.

Specifically, a first blade-width-direction side of the blade tip section 1 is imaged so as to capture the first-side corner section 2 formed on a first blade-width-direction side of the corner section to acquire the imaged picture 3 of the first side of the blade tip section, the grooving tool is moved in parallel to the blade width direction, and the second blade-width-direction side of the blade tip section 1 is imaged so as to capture the second-side corner section 4 formed on the second blade-width-direction side to acquire the imaged picture 5 of the second side of the blade tip section, the corner sections being formed at the two ends of the blade tip section 1 in the blade width direction.

Next, the imaged picture 3 of the first side of the blade tip section and the imaged picture 5 of the second side of the blade tip section are subjected to suitable image processing (e.g., binarization, noise removal, and the like), the edges of the blade tip section 1 are detected in the imaged pictures of the blade tip section to acquire an outline shape of the blade tip section 1, after which reference points are acquired for measuring: the blade width W1 in the imaged picture of the first side of the blade tip section, which is based on the imaged picture 3 of the first side of the blade tip section, from a terminal end 2A of the first-side corner section 2 of the blade tip section 1 in the imaged picture 3 of the first side of the blade tip section to an intermediate point along the blade width W of the blade tip section 1; and the blade width W2 in the imaged picture of the second side of the blade tip section, which is based on the imaged picture 5 of the second side of the blade tip section, from the terminal end 4A of the second-side corner section 4 of the blade tip section 1 to an intermediate point along the blade width W of the blade tip section 1 in the imaged picture 5 of the second side of the blade tip section, in which the second blade-width-direction side of the blade tip section 1 including the second-side corner section 4 formed on the second blade-width-direction side of the corner section has been imaged.

In the method for measuring the blade width of the grooving tool of the present example, these reference points are used as the center point of the nose R of the corner sections; specifically, in the imaged picture 3 of the first side of the blade tip section, the center point O1 of a first-side nose R, which is the center point of the nose R of the first-side corner section 2, is acquired as a reference point, and in the imaged picture 5 of the second side of the blade tip section, the center point O2 of a second-side nose R, which is the center point of the nose R of the second-side corner section 4, is acquired as a reference point. Acquisition of the center point O1 of the first-side nose R and the center point O2 of the second-side nose R is carried out using, e.g., the method of least squares or another technique from the outline shape acquired by edge detection, or using another suitable technique.

Next, the first-side blade-width-direction straight line A1 of a vertical line or horizontal line (a vertical line when inside or outside diameter grooving is performed, and a horizontal line when upper end surface grooving is performed) that passes through the center point O1 of the first-side nose R in the imaged picture 3 of the first side of the blade tip section is drawn, the terminal end 2A of the first-side corner section 2, which is the intersection of the first-side blade-width-direction straight line A1 with the outline shape of the blade tip section 1 in the imaged picture 3 of the first side of the blade tip section, and the imaged-picture end part X1 on the first-side blade-width-direction straight line A1 in the imaged picture 3 of the first side of the blade tip section are acquired, and the number of pixels between the terminal end 2A of the first-side corner section 2 in the imaged picture 3 of the first side of the blade tip section and the imaged-picture end part X1 are counted, and furthermore, the second-side blade-width-direction straight line A2 of a vertical line or horizontal line (a vertical line when inside or outside diameter grooving is performed, and a horizontal line when upper end surface grooving is performed) that passes through the center point O2 of the second-side nose R in the imaged picture 5 of the second side of the blade tip section is drawn, the terminal end 4A of the second-side corner section 4, which is the intersection of the second-side blade-width-direction straight line A2 with the outline shape of the blade tip section 1 in the imaged picture 5 of the second side of the blade tip section, and the imaged-picture end part X1 on the second-side blade-width-direction straight line A2 in the imaged picture 5 of the second side of the blade tip section are acquired, and the number of pixels between the terminal end 4A of the second-side corner section 4 in the imaged picture 5 of the second side of the blade tip section and the imaged-picture end part X2 are counted.

Next, the distance (dimension) per pixel is multiplied by the counted number of pixels, the blade width of the portion of the blade tip section 1 shown in the imaged picture 3 of the first side of the blade tip section (blade width W1 in the imaged picture of the first side of the blade tip section) and the portion of the blade tip section 1 shown in the imaged picture 5 of the second side of the blade tip section (blade width W2 in the imaged picture of the second side of the blade tip section) are calculated, and the blade width W is calculated on the basis of the blade width W1 in the imaged picture of the first side of the blade tip section and the blade width W2 in the imaged picture of the second side of the blade tip section.

Specifically, in addition to the blade width W1 in the imaged picture of the first side of the blade tip section and the blade width W2 in the imaged picture of the second side of the blade tip section, the following values are also used in calculating the blade width W: the width-direction length L1 of the imaging range, which is the direction of movement of grooving tool in the imaging range of the camera (or the blade width direction of the blade tip section 1 being imaged); and the movement distance L2 of the grooving tool or camera (the grooving tool in the present example) from a first imaging position in which the imaged picture 3 of the first side of the blade tip section is imaged to a second imaging position in which the imaged picture 5 of the second side of the blade tip section is imaged.

The width-direction length L1 of the imaging range is measured in advance and inputted to the tool assessment device as a known value, and the movement distance L2 of the grooving tool is inputted on each occasion to the tool assessment device side as a control value from the machine tool side.

Computations are performed using the values of the blade width W1 in the imaged picture of the first side of the blade tip section, the blade width W2 in the imaged picture of the second side of the blade tip section, the width-direction length L1 of the imaging range, and the movement distance L2 of the grooving tool, as well as the formula W=W1+W2−(L1−L2), whereby the blade width W of the blade tip section 1 of the grooving tool is determined.

Examples of measuring the blade width W of the blade tip section 1 of the grooving tool are described below.

[Measurement Example 1]

Figure 1B:
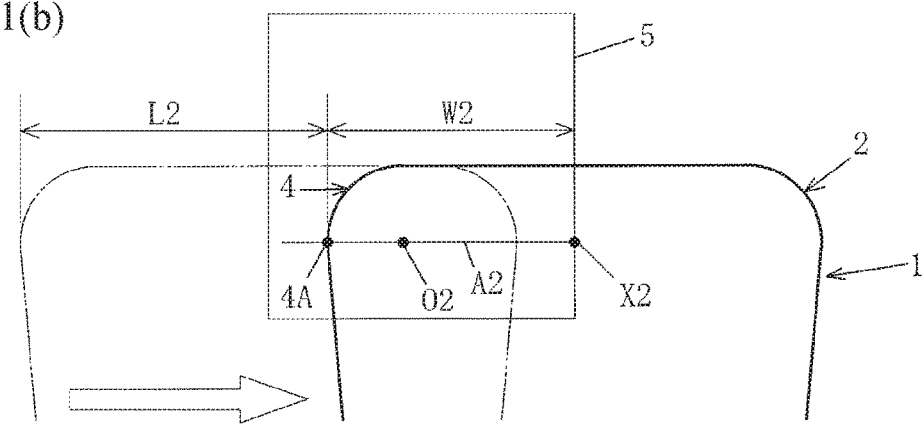
Figure 2:
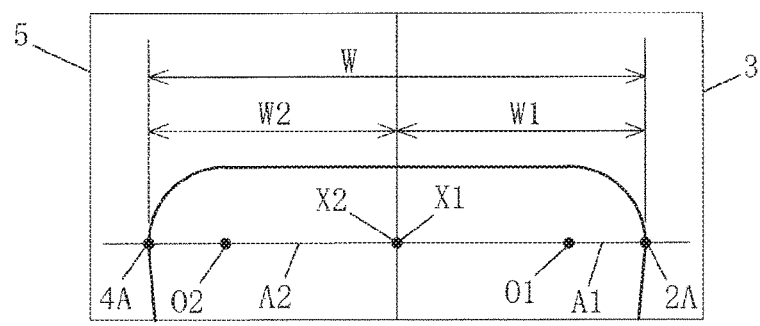
FIG. 2 is a schematic view (mainly an illustration of the imaged picture) of measurement example 1 of the present example.

FIGS. 1(a), 1(b) and 2 show a case in which there is no overlapping of imaging locations in the imaged picture 3 of the first side of the blade tip section and the imaged picture 5 of the second side of the blade tip section, and imaging has been performed so that there is no location on the blade tip section 1 that has not been imaged, in other words, a case in which the blade width W of the blade tip section 1 is less than the sum of the imaging ranges (the lengths of the imaging ranges in the same direction as the blade width direction) of the imaged picture 3 of the first side of the blade tip section and the imaged picture 5 of the second side of the blade tip section.

In this case, the movement distance L2 of the grooving tool and the width-direction length L1 of the imaging range have the same value, i.e., L1=L2. Therefore, blade width W is calculated by adding together the blade width W1 in the imaged picture of the first side of the blade tip section and the blade width W2 in the imaged picture of the second side of the blade tip section because (L1−L2)=0 in the formula W=W1+W2−(L1−L2).

[Measurement Example 2]

Figure 3A:
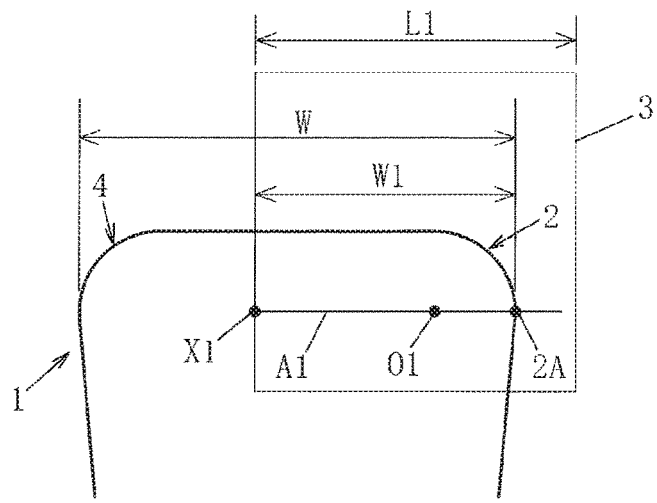
FIGS. 3(a) and 3(b) are schematic views (mainly an illustration of the imaging range) of measurement example 2 of the present example.
Figure 3B:
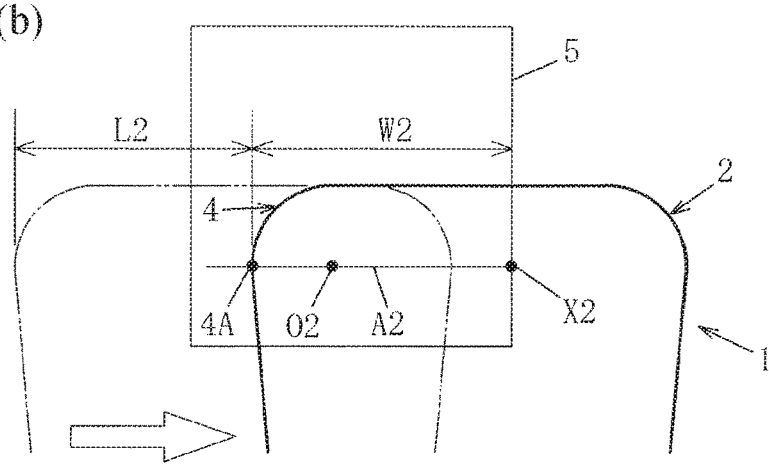
Figure 4:
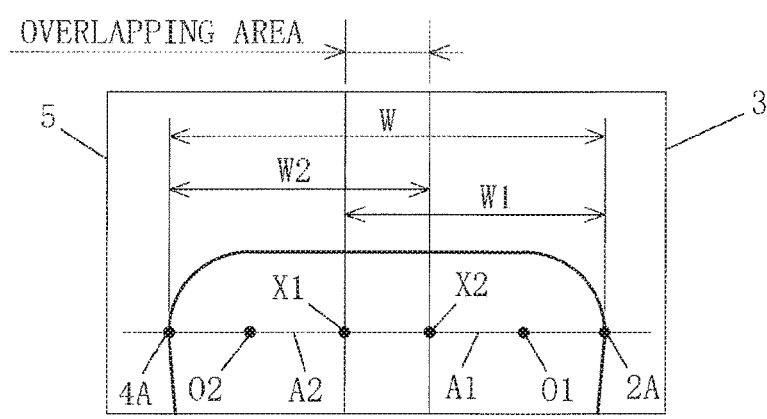
FIG. 4 is a schematic view (mainly an illustration of the imaged picture) of measurement example 2 of the present example.

FIGS. 3(a), 3(b) and 4 are a case in which imaging has been carried out so as to produce overlapping in the imaging locations of the imaged picture 3 of the first side of the blade tip section and imaged picture 5 of the second side of the blade tip section, i.e., a case in which the blade width W of the blade tip section 1 is less than the sum of the imaging ranges (the lengths of the imaging ranges in the same direction as the blade width direction) of the imaged picture 3 of the first side of the blade tip section and the imaged picture 5 of the second side of the blade tip section in similar fashion to measurement example 1.

In this case, the difference between the movement distance L2 of the grooving tool and the width-direction length L1 of the imaging range, specifically, the value of L1−L2 is the overlapping region part of the imaged picture 3 of the first side of the blade tip section and the imaged picture 5 of the second side of the blade tip section. Therefore, the blade width W is calculated by subtracting the overlapping region part of the imaged picture 3 of the first side of the blade tip section and the imaged picture 5 of the second side of the blade tip section from the value obtained by adding together the blade width W1 in the imaged picture of the first side of the blade tip section and the blade width W2 in the imaged picture of the second side of the blade tip section, in other words, by using the formula W=W1+W2−(L1−L2).

[Measurement Example 3]

Figure 5A:
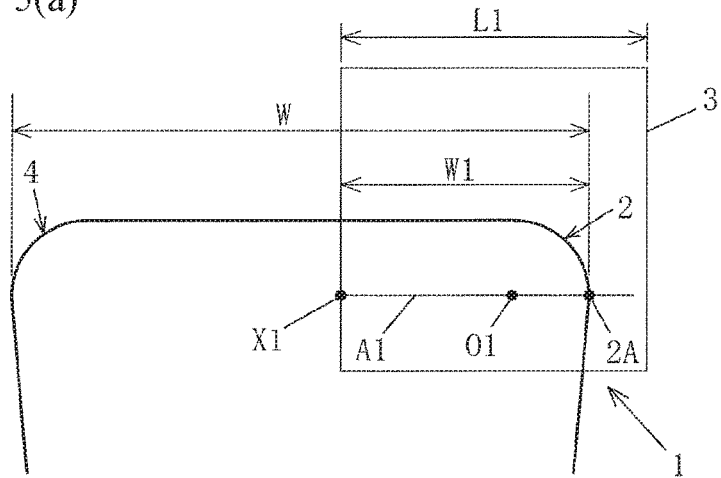
FIGS. 5(a) and 5(b) are schematic views (mainly an illustration of the imaging range) of measurement example 3 of the present example.
Figure 5B:
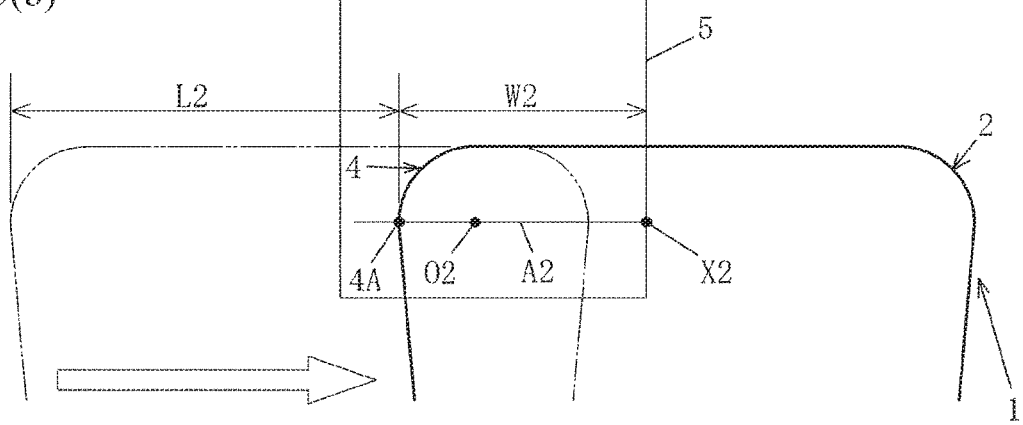
Figure 6:
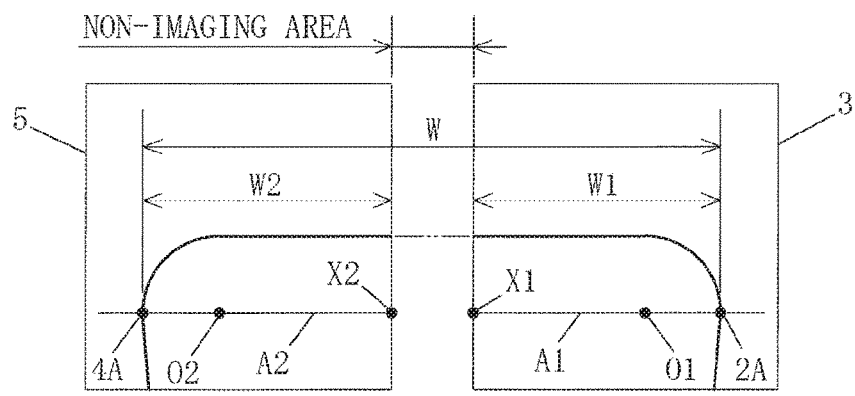
FIG. 6 is a schematic view (mainly an illustration of the imaged picture) of measurement example 3 of the present example.

FIGS. 5(a), 5(b) and 6 are a case in which there is no overlapping of imaging locations in the imaged picture 3 of the first side of the blade tip section and the imaged picture 5 of the second side of the blade tip section, and imaging has been carried out so as to produce a non-imaged area of the blade tip section 1, in other words, a case in which the blade width W of the blade tip section 1 is greater than the sum of the imaging ranges (the lengths of the imaging ranges in the same direction as the blade width direction) of the imaged picture 3 of the first side of the blade tip section and the imaged picture 5 of the second side of the blade tip section.

In this case, the difference between the movement distance L2 of the grooving tool and the width-direction length L1 of the imaging range, specifically, the value of L2−L1 is the non-imaged area part which has not been imaged by either of the imaged picture 3 of the first side of the blade tip section or the imaged picture 5 of the second side of the blade tip section. Therefore, the blade width W is calculated by adding the non-imaged area part to the value obtained by adding together the blade width W1 in the imaged picture of the first side of the blade tip section and the blade width W2 in the imaged picture of the second side of the blade tip section, in other words, by using the formula W=W1+W2+(L2−L1)=W1+W2−(L1−L2).

Last, the measured blade width W is compared with the earlier acquired blade width dimension information of the grooving tool set in the machining program. When the measured blade width W is a numerical value within the permissible range in relation to the value of the blade width dimension information, it is assessed that the correct tool set in the machining program has been mounted, and an instruction (signal) to proceed to the next work step is sent to the machine tool side (control device). When the measured blade width is a numerical value that is outside of the permissible range, it is assessed that a tool (tip) that is different from the tool (tip) set in the machining program, i.e., an unsuitable tool (tip) that does not match the machining conditions has been mounted, and an instruction (signal) that temporarily stops work is sent to the machine tool side (control device), and the assessment process is ended.

Thus, in the method for measuring a grooving tool of the present example, a blade tip section 1 is separately imaged in two imaged pictures of the imaged picture 3 of the first side of the blade tip section and the imaged picture 5 of the second side of the blade tip section, and measurements are made of the blade width W on the basis of the blade width W1 in the imaged picture of the first side of the blade tip section, the blade width W2 in the imaged picture of the second side of the blade tip section, the width-direction length L1 of the imaging range, and the movement distance L2 of the grooving tool obtained from the imaged picture 3 of the first side of the blade tip section and the imaged picture 5 of the second side of the blade tip section. Therefore, it is possible to image the blade tip section 1 at twice the magnification of when the entire blade tip section 1 is imaged using at least one imaged picture. Consequently, blade width can be measured with high precision similarly for wide and narrow blade widths W without using expensive imaging means (a camera) having a large element size or without reducing magnification to increase the imaging range.

Furthermore, when the blade width W is to be measured, the center points of the noses R of the corner sections shown in the imaged pictures of the blade tip section are used as a reference, and the reproducibility of the measured positions is therefore excellent, and highly precise assessment can be realized.

Therefore, the tool assessment device of the present example in which the method for measuring the blade width of a grooving tool is used has excellent practicality in that, when the tool to be assessed is a grooving tool, highly precise assessment is possible regardless of the magnitude of the blade width W of the blade tip section 1 of the grooving tool.

The present invention is not limited to the present example; the specific configuration of the constituent features can be designed, as appropriate.

What is claimed is:

1. A method for measuring a blade width W of a blade tip section of a grooving tool mounted on a machine tool, wherein a determination is made of a blade width W1 of an imaged picture of a first side of the blade tip section, which is based on an imaged picture of the first side of the blade tip section from a terminal end of a first-side corner section of the blade tip section in the imaged picture of the first side of the blade tip section to an intermediate point along the blade width W of the blade tip section, the imaged picture of the first side of the blade tip section being obtained by imaging, using imaging means provided to the machine tool, the first blade-width-direction side of the blade tip section including the first-side corner section formed on the first blade-width-direction side of a corner section; a determinations is made of a blade width W2 of an imaged picture of the second side of the blade tip section, which is based on an imaged picture of a second side of the blade tip section from a terminal end of a second-side corner section of the blade tip section in the imaged picture of the second side of the blade tip section to an intermediate point along the blade width W of the blade tip section, the imaged picture of the second side of the blade tip section being obtained by imaging, using the imaging means, the second blade-width-direction side of the blade tip section including the second-side corner section formed on the second blade-width-direction side of the corner section; the corner sections are formed at each of the two blade-width-direction ends of the blade tip section of the grooving tool; and computational processing is performed on the basis of the blade width W1 in the imaged picture of the first side of the blade tip section and the blade width W2 in the imaged picture of the second side of the blade tip section to determine the blade width W of the blade tip section of the grooving tool.

2. The method for measuring a blade width of a grooving tool according to claim 1, wherein the blade width W1 in the imaged picture of the first side of the blade tip section, the blade width W2 in the imaged picture of the second side of the blade tip section, a width-direction length L1 of the imaging range, which is the direction of movement of the grooving tool in the imaging range of the imaging means, and the movement distance L2 of the grooving tool or the imaging means from a first imaging position where the imaged picture of the first side of the blade tip section has been imaged to a second imaging position where the imaged picture of the second side of the blade tip section has been imaged, are each determined; and the computational processing is carried out using the formula $W=W1+W2-(L1-L2)$ to determine the blade width W of the blade tip section of the grooving tool.

3. The method for measuring a blade width of a grooving tool according to claim 2, wherein the blade width W1 in the imaged picture of the first side of the blade tip section is determined on the basis of a first-side blade-width-direction straight line that passes through the center point of a first-side nose R of the first-side corner section in the imaged picture of the first side of the blade tip section, and on the basis of the terminal end of the first-side corner section, which is an intersecting point of the first-side blade-width-direction straight line with an outline of the blade tip section of the grooving tool, and the blade width W2 in the imaged picture of the second side of the blade tip section is determined on the basis of a second-side blade-width-direction straight line that passes through a center point of a second-side nose R of the second-side corner section in the imaged picture of the second side of the blade tip section, and on the basis of the terminal end of the second-side corner section, which is an intersecting point of the second-side blade-width-direction straight line with the outline of the blade tip section of the grooving tool.

4. The method for measuring a blade width of a grooving tool according to claim 3, wherein the blade width W1 in the imaged picture of the first side of the blade tip section is determined on the basis of the number of pixels between the terminal end of the first-side corner section and an imaged-picture end part of the imaged picture of the first side of the blade tip section on the first-side blade-width-direction straight line, and the blade width W2 in the imaged picture of the second side of the blade tip section is determined on the basis of the number of pixels between the terminal end of the second-side corner section and an imaged-picture end part of the imaged picture of the second side of the blade tip section on the second-side blade-width-direction straight line.

* * * * *